(12) United States Patent
Chang

(10) Patent No.: US 7,573,660 B2
(45) Date of Patent: Aug. 11, 2009

(54) LENS MODULE AND CAMERA MODULE HAVING SAME

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/164,418

(22) Filed: Jun. 30, 2008

(65) Prior Publication Data

US 2009/0141375 A1    Jun. 4, 2009

(30) Foreign Application Priority Data

Nov. 30, 2007    (CN) .................... 2007 1 0202795

(51) Int. Cl.
*G02B 7/00*    (2006.01)
(52) U.S. Cl. .................................. 359/822; 359/819
(58) Field of Classification Search ................ 359/819, 359/820, 822, 823, 824, 826, 827
See application file for complete search history.

(56) References Cited

U.S. PATENT DOCUMENTS

| 6,967,785 B2 | 11/2005 | Makii et al. |
| 2008/0266684 A1 * | 10/2008 | Chang ................... 359/827 |

* cited by examiner

*Primary Examiner*—Timothy J Thompson
(74) *Attorney, Agent, or Firm*—Andrew C. Cheng

(57) ABSTRACT

A lens module includes a lens barrel, a first lens, a number of elastic members, first and magnetic field generators, and a holder threadedly engaged with the lens barrel. The first lens is attached within the lens barrel by the elastic members. The first magnetic field generators are arranged on the lens and configured for generating a first magnetic field in a direction along a central axis of the first lens. The holder has a number of receiving holes therein. The second magnetic field generators are received in the respective receiving holes of the holder and are configured for generating a second magnetic field in a direction essentially the same as or opposite to that of the first magnetic field, such that the first magnetic field generators together with the first lens are movable along the direction of the central axis of the first lens.

12 Claims, 3 Drawing Sheets

LENS MODULE AND CAMERA MODULE HAVING SAME

BACKGROUND

1. Technical Field

The present invention relates to lens modules, and particularly to a lens module with a driving mechanism for a single lens, and a camera module having the lens module.

2. Description of Related Art

With the ongoing development of microcircuitry and multimedia technology, camera modules, including, e.g., still camera modules and digital camera modules are now in widespread use and are being combined with various electronic devices. These cameras modules are often required to have auto focusing or zooming functions.

Lens modules are key components of the cameras modules. Nowadays, driving mechanisms, such as step motors, have been integrated in the lens modules for driving the lenses to move, thereby achieving the auto focusing or zooming functions. However, the step motor is relatively bulky and heavy if it is applied for a single lens, and, in addition, the step motor consumes a substantial amount of power, especially relative to the amount of power that can be stored in a typical battery system of an electronic device.

What is needed, therefore, is a lens module having a simple and energy-efficient driving mechanism for a single lens, and a camera module using the lens module.

SUMMARY

An exemplary lens module includes: a lens barrel having an inner thread therein, a first lens received in the lens barrel, a number of elastic members, a number of first and second magnetic field generators, and a hollow holder. Each of the elastic members has a first end attached on the first lens and an opposite second end attached on an inner wall of the lens barrel. The first magnetic field generators are arranged on the first lens. The holder has an outer thread thereon and a number of receiving holes therein. The holder is threadedly engaged with the lens barrel. The second magnetic field generators are received in the respective receiving holes of the holder. The first and second magnetic field generators are configured for cooperatively generating a combined magnetic force applied to the first lens to move the first lens along the direction of a central axis of the first lens toward or away from the holder.

Other advantages and novel features of the present invention will become more apparent from the following detailed description of embodiments when taken in conjunction with the accompanying drawings.

BRIEF DESCRIPTION OF THE DRAWINGS

Many aspects of the lens module and camera module can be better understood with reference to the following drawings. The components in the drawings are not necessarily drawn to scale, the emphasis instead being placed upon clearly illustrating the principles of the present lens module and camera module. Moreover, in the drawings, like reference numerals designate corresponding parts throughout the several views.

DETAILED DESCRIPTION OF THE EMBODIMENTS

Embodiments of the present lens module and camera module will now be described in detail below and with reference to the drawings.

Figure 1:
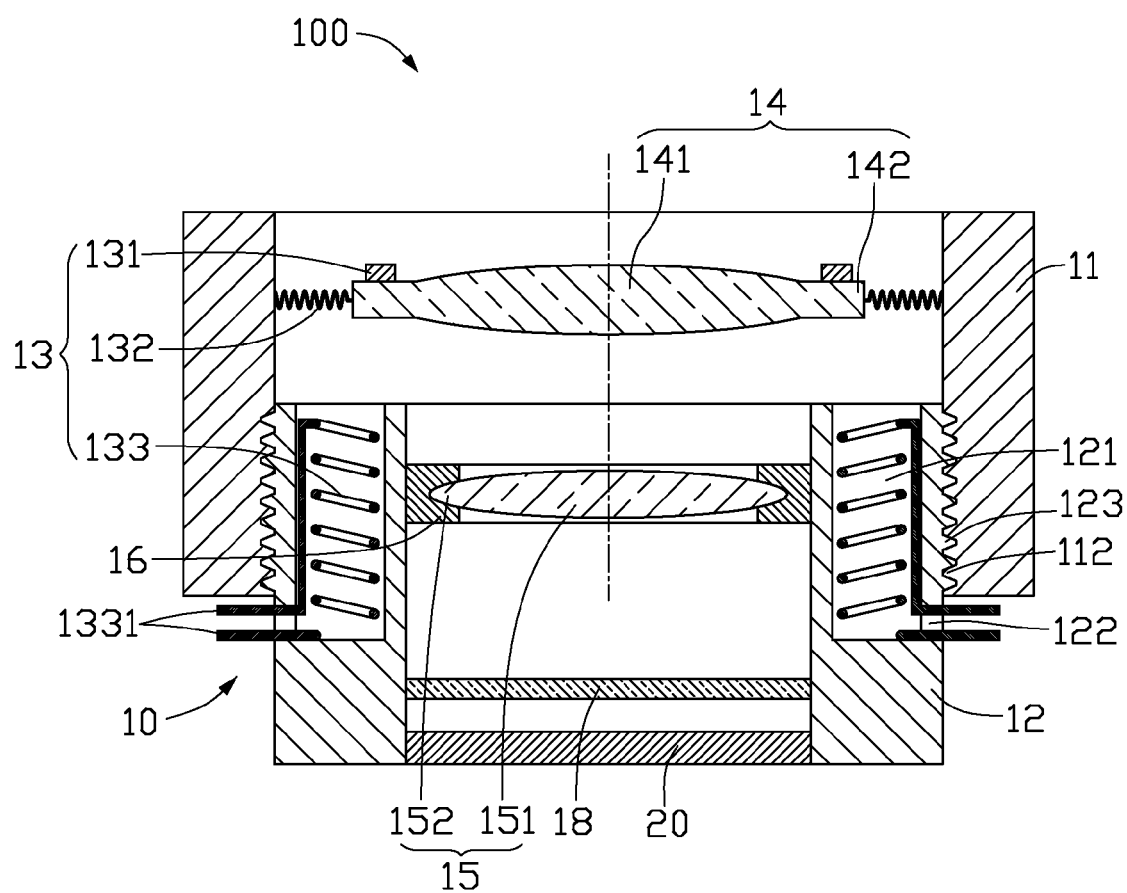
FIG. 1 is a schematic view of a camera module in accordance with a first preferred embodiment of the present invention.
Figure 2:
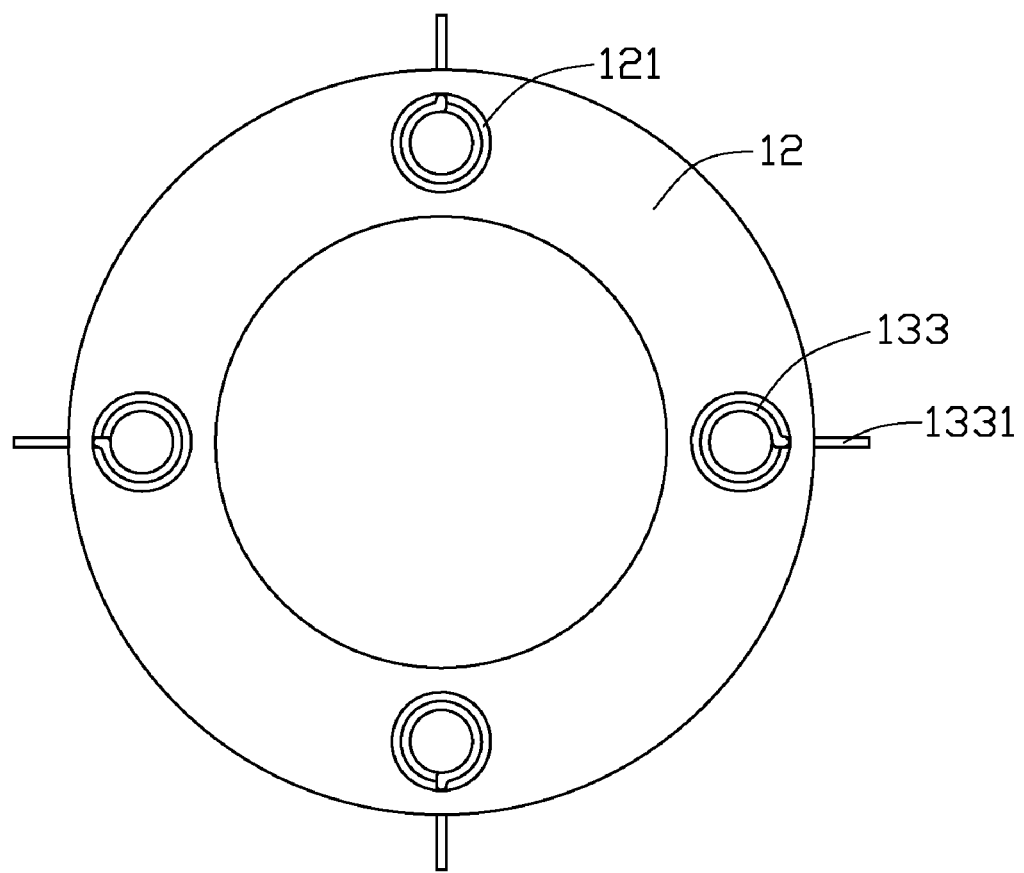
FIG. 2 is a plan view of the coils of circuit wire and the holder shown in FIG. 1.

Referring to FIGS. 1 and 2, an exemplary camera module 100 in accordance with a first embodiment, is provided. The camera module 100 includes a lens module 10 and an image sensor 20 in alignment with the lens module 10.

The lens module 10 includes a lens barrel 11, a holder 12, a first lens 14, a second lens 15, and a driving mechanism 13 for driving the first lens 14.

The lens barrel 11 and the holder 12 are both cylindrical shaped. The lens barrel 11 has an inner thread 112 therein. The holder 12 has an outer thread 123 thereon. The lens barrel 11 is threadedly engaged with the holder 12. The holder 12 further includes four receiving holes 121 therein, and four through holes 122 allowing the receiving holes 121 to communicate with outside.

The first lens 14 and the second lens 15 each can be made of plastic or glass. The first and second lenses 14, 15 each have a central optical portion 141, 151 and a peripheral portion 142, 152 surrounding the central optical portion 141, 151. The central optical portions 141, 151 each can be in a spherical or aspherical shape. The first lens 14 is received in the lens barrel 11. The second lens 15 is received in the holder 12 by a retaining ring 16. A central axis of the first lens 14 is overlapped with that of the second lens 15.

The driving mechanism 13 includes four first magnetic field generators 131, for elastic members 132 and four second magnetic field generators 133. Each of the first magnetic field generators 131 is a permanent magnet. The first magnetic field generators 131 are arranged on the peripheral portion 142 of the first lens 14, and configured for generating a first magnetic field essentially in a direction along the central axis of the first lens 14. Each of the elastic members 132 is a spring. Each of the elastic members 132 has a first end attached on the first lens 14, and an opposite second end 15 attached on an inner wall of the lens barrel 11. Each of the second magnetic field generators 133 is a coil of circuit wire, and is arranged in one of the respective receiving holes 121, with two ends 1331 thereof passing through the corresponding through holes 122. The two ends 1331 of the second magnetic field generators 133 are connected to a power source (not shown).

The image sensor 22 can be selected from a charge coupled device (CCD) or a complementary metal oxide semiconductor transistor (CMOS). Preferably, a glass cover 18 is arranged above the image sensor 22 for preventing the image sensor 22 from dust pollution.

When a first current in a flowing direction is applied to each of the second magnetic field generators 133, a second magnetic field is generated in a direction essentially the same as that of the first magnetic field generated by the first magnetic field generators 131. In this case, the first magnetic field generators 131 together with the first lens 14 are repelled apart from the second lens 15, and thus reach a second position. When the first current is powered off, the second magnetic field disappears, and the first magnetic field generators 131 together with the first lens 14 returns to the original position.

When a second current in an opposite flowing direction is applied to each of the second magnetic field generators 133, a second magnetic field is generated in a direction essentially opposite to that of the first magnetic field generated by the first magnetic field generators 131. In this case, the first magnetic field generators 131 together with the first lens 14 are attracted toward the second lens 15, and thus reach a third position. In this way, the first magnetic field generators 131 together with the first lens 14 are movable relative to the second lens 15 along the direction of the central axis of the first lens 14 between three positions. A zooming function of the camera module 100 can thus be achieved.

It is understood that the number of first magnetic field generators 131, the elastic members 132 and the second magnetic field generators 133 can vary according to need. The first magnetic field generators 131 can be connected to a ring-shaped permanent magnet. The second magnetic field generators 133 each can have a iron core therein.

Figure 3:
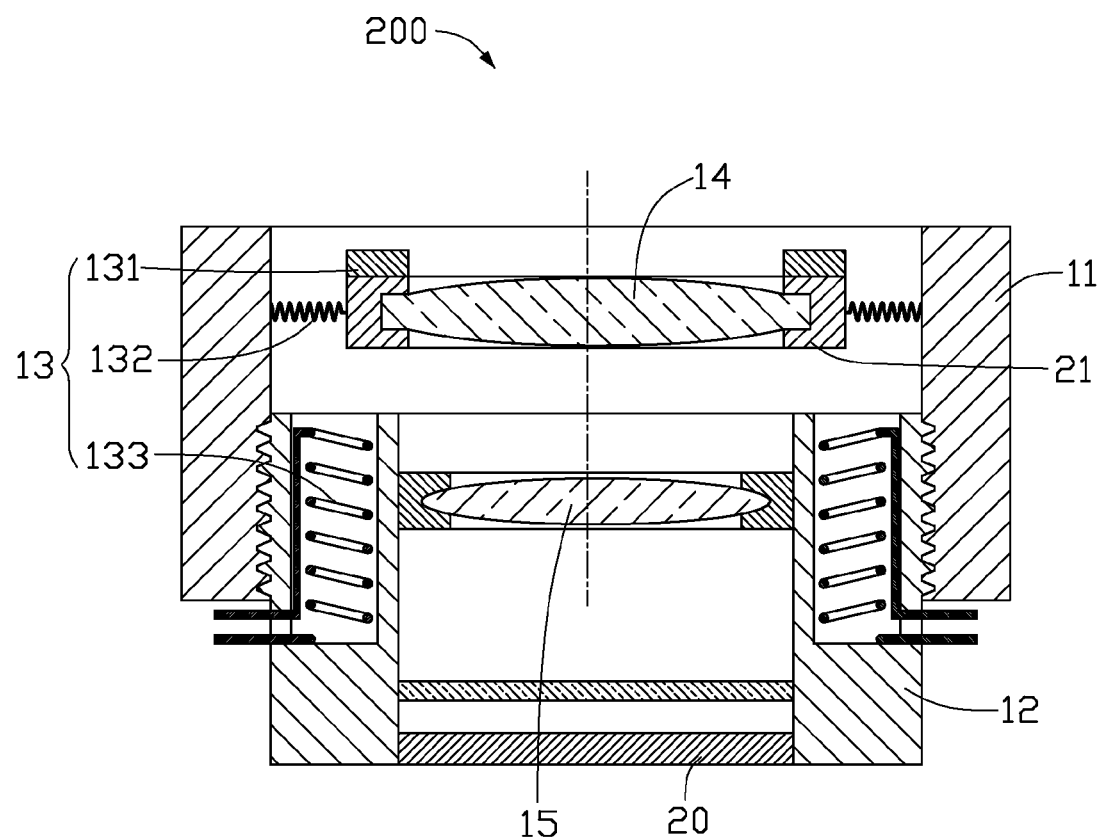
FIG. 3 is a schematic view of a camera module in accordance with a second preferred embodiment of the present invention.

Referring to FIG. 3, an exemplary camera module 200 in accordance with a second embodiment, is provided. The camera module 200 is essentially similar to the camera module 100 illustrated above, however, the first lens 14 is retained in a retaining ring 21, the first magnetic field generators 131 are arranged on the retaining ring 21, and the elastic members 132 are attached on the retaining ring 21. The first magnetic field generators 131 and the retaining ring 21 can be integrally formed together.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:
   a lens barrel having an inner thread therein;
   a first lens received in the lens barrel;
   a plurality of elastic members each having a first end attached on the first lens and an opposite second end attached on an inner wall of the lens barrel;
   a plurality of first magnetic field generators arranged on the first lens;
   a hollow holder having an outer thread thereon and a plurality of receiving holes therein, the holder being threadedly engaged with the lens barrel; and
   a plurality of second magnetic field generators received in the respective receiving holes of the holder, the first and second magnetic field generators configured for cooperatively generating a combined magnetic force applied to the first lens to move the first lens along the direction of a central axis of the first lens toward or away from the holder.

2. The lens module as described in claim 1, further comprising a second lens fixed within the holder.

3. The lens module as described in claim 1, wherein each of the first magnetic field generators is a permanent magnet.

4. The lens module as described in claim 3, wherein the first magnetic field generators are connected to each other to form a ring-shaped magnet.

5. The lens module as described in claim 1, wherein each of the second magnetic field generators is an electromagnet.

6. The lens module as described in claim 1, wherein the first lens has a central optical portion and a peripheral portion surrounding the central optical portion, the first magnetic field generators being arranged on the peripheral portion of the first lens.

7. A camera module, comprising:
   a lens barrel having an inner thread therein;
   a first lens received in the lens barrel;
   a plurality of elastic members each having a first end attached on the first lens and an opposite second end attached on an inner wall of the lens barrel;
   a plurality of first magnetic field generators arranged on the first lens;
   a hollow holder having an outer thread thereon and a plurality of receiving holes therein, the holder being threadedly engaged with the lens barrel;
   an image sensor received in the holder; and
   a plurality of second magnetic field generators received in the respective receiving holes of the holder, the first and second magnetic field generators configured for cooperatively generating a combined magnetic force applied to the first lens to move the first lens relative to the image sensor.

8. The camera module as described in claim 7, further comprising a second lens fixed within the holder.

9. The camera module as described in claim 7, wherein each of the first magnetic field generators is a permanent magnet.

10. The camera module as described in claim 9, wherein the first magnetic field generators are connected to each other to form a ring-shaped magnet.

11. The camera module as described in claim 7, wherein each of the second magnetic field generators is an electromagnet.

12. The camera module as described in claim 7, wherein the first lens has a central optical portion and a peripheral portion surrounding the central optical portion, the first magnetic field generators being arranged on the peripheral portion of the first lens.

* * * * *